(12) United States Patent
Hauber

(10) Patent No.: US 9,352,825 B2
(45) Date of Patent: May 31, 2016

(54) AIRCRAFT

(71) Applicant: Liebherr-Aerospace Lindenberg GmbH, Lindenberg/Aligäu (DE)

(72) Inventor: Bernhard Hauber, Scheidegg (DE)

(73) Assignee: Liebherr-Aerospace Lindenberg GmbH, Lindenberg/Aligäu (DE)

( * ) Notice: Subject to any disclaimer, the term of this patent is extended or adjusted under 35 U.S.C. 154(b) by 4 days.

(21) Appl. No.: 14/341,033

(22) Filed: Jul. 25, 2014

(65) Prior Publication Data

US 2015/0076282 A1 Mar. 19, 2015

(30) Foreign Application Priority Data

Jul. 26, 2013 (DE) .......................... 10 2013 012 505

(51) Int. Cl.
| | |
|---|---|
| *B64C 13/42* | (2006.01) |
| *B64C 13/34* | (2006.01) |
| *B64C 13/36* | (2006.01) |
| *B64C 13/50* | (2006.01) |
| *B64C 13/28* | (2006.01) |
| *B64C 3/38* | (2006.01) |
| *B64C 9/02* | (2006.01) |

(52) U.S. Cl.
CPC . *B64C 13/34* (2013.01); *B64C 3/38* (2013.01); *B64C 9/02* (2013.01); *B64C 13/28* (2013.01); *B64C 13/36* (2013.01); *B64C 13/42* (2013.01); *B64C 13/50* (2013.01)

(58) Field of Classification Search
CPC .......... B64C 13/42; B64C 13/36; B64C 13/34
See application file for complete search history.

(56) References Cited

U.S. PATENT DOCUMENTS

| | | | | |
|---|---|---|---|---|
| 7,464,896 | B2 * | 12/2008 | Carl | ........................ B64C 13/34 244/99.2 |
| 9,108,740 | B2 * | 8/2015 | Fleddermann | .......... B64C 13/42 |
| 2009/0302153 | A1 | 12/2009 | Matasso et al. | |
| 2011/0042511 | A1 * | 2/2011 | Elliott | ..................... B64C 13/34 244/102 R |
| 2011/0062282 | A1 * | 3/2011 | Richter | .................. B64C 13/42 244/99.4 |
| 2013/0327887 | A1 * | 12/2013 | Dyckrup | ................. B64C 13/42 244/99.9 |

FOREIGN PATENT DOCUMENTS

| | | |
|---|---|---|
| DE | 10 2012 005 346 A1 | 9/2013 |
| EP | 1 795 987 A2 | 6/2007 |
| EP | 2 070 817 A2 | 6/2009 |

* cited by examiner

*Primary Examiner* — Tien Dinh
*Assistant Examiner* — Richard R Green
(74) *Attorney, Agent, or Firm* — Dilworth & Barrese, LLP

(57) ABSTRACT

The invention relates to an aircraft having at least one high lift system which is arranged at the wing of the aircraft and which comprises a drive for converting electrical or hydraulic energy into a speed-controlled rotational movement, wherein the aircraft furthermore has at least one control unit which controls the high lift system, wherein the drive comprises in accordance with the invention a main drive and an alternative drive, wherein the alternative drive is fed by a decentralized energy source.

10 Claims, 1 Drawing Sheet

AIRCRAFT

BACKGROUND OF THE INVENTION

The invention relates to an aircraft having at least one high lift system which is arranged at the wing of the aircraft and which comprises at least one drive for converting electrical or hydraulic energy into a speed-controlled rotational movement, wherein the aircraft furthermore has at least one control unit which controls the high lift system.

Typically, an apparatus at a wing of an aircraft is to be understood as a high lift system which serves to increase the lift coefficient of the wing in the take-off and landing phases, whereby the aircraft is already able to fly at low speeds. As a rule, the flap systems and/or the slat system is/are to be understood by this. Conventional high lift systems are directly connected to the electrical and/or hydraulic on-board supply of the aircraft. Power is removed from this on-board supply during the actuation of the high lift system.

A central drive unit positioned in the fuselage converts hydraulic and/or electrical energy into a speed-controlled rotational movement having a corresponding torque. The drive unit is connected to the transmission system located in the wing to forward the torque to actuators. The actuators take up the rotational movement of the transmission shafts and convert it into a movement in translation with which the individual flaps of the high lift system are actuated or are moved in and out. The high lift system has a large number of monitoring sensors which monitor the correct system function and serve as regulation parameters for the electronic control. Safety devices avoid critical system defect functions in the event of a defect. The high lift system is linked to flight control computers which represent the interface between the input commands input in the cockpit and the drive unit to be controlled.

When designing high lift systems, their availability is of particular importance. It is typically insured by the architecture of the power supply and of the high lift systems that on a failure of specific power supply systems the slat system can still be actuated to allow a safe landing of the aircraft (so-called stall protection).

It is also of significance to be able to actuate the flap system since then, the landing can be carried out substantially more easily and with much less risk, in particular with still fully fueled and so heavier aircraft.

The availability of the high lift system substantially depends on the availability of the drives and of the power supply systems connected thereto. The failure probability of a hydraulic power supply system of a passenger aircraft is around $5 \times 10^{-4}$/Fh. The failure probability of an electrical power supply system is approximately $1 \times 10^{-5}$/Fh.

In the prior art, two drive motors have typically been coupled via a transmission to ensure the drive of the high lift systems. In this respect, both drives are each connected to the power supply systems of the aircraft.

These drive units can generally be built up in accordance with the following different architectures:

In active/active operation, both motors are always operated together, with them cooperating via a so-called speed summing differential transmission.

Alternatively, both motors can also be operated together in an active/active operation and can cooperate with a so-called torque summing.

In active/passive operation, one main motor is normally operated, with another motor being available in the event of a defect.

In this prior art, there is the problem that both motors are always connected to the central power supply of the aircraft.

This degrades the availability and results in a comparatively high weight.

It is already known from DE 10 2012 00 53 46 A to decouple the entire high lift system from the central supply and to operate it centrally or per flap operation by using electrical energy stores.

On the other hand, it is known from US 2009/0302153 A1 to provide batteries or ultracaps for the central supply of the aircraft with energy as electrical buffers for the recovery or for the brief increased consumption of electrical supply.

SUMMARY OF THE INVENTION

It is the object of the present invention to further develop the availability of a drive for high lift systems such that the overall system can have a comparatively simpler construction with a very high availability.

This object is achieved in accordance with the invention by the combination of the features herein. Accordingly, an aircraft is provided having at least one high lift system which is arranged at the wing of the aircraft and comprises a drive for converting electrical or hydraulic energy into a speed-controlled rotational movement, with the aircraft furthermore having at least one control unit which controls the high lift system. In such an aircraft in accordance with the invention, the drive is formed from a main drive and an alternative drive, with the alternative drive being fed from a decentralized energy source.

The main drive can advantageously be provided with 100% drive power with this solution, whereas the alternative drive does not have to provide this 100% drive power, on the other hand. It is important for the emergency operation by the alternative drive in a high lift system that the slats or the flaps can still be moved at all. In the event of a defect, it is, however, acceptable that the slats or the flaps, that is the systems of the high lift system, require a longer period to deploy in comparison with normal operation.

This drive topology has the result in accordance with the invention of a very simple, light and inexpensive drive which nevertheless has a very high availability, i.e. failure safety.

The battery operated alternative drive can particularly advantageously designed exactly for the demands of the observed defect case or of any other operating event. It can be assumed that the operation of the alternative drive occurs relatively rarely and then also only needs a very small amount of energy since here, for example, a moving in and out of the high lift systems is only necessary two to three times.

Since the alterative drive can be exactly developed for these demands and since the special conditions also do not have to be considered by other aircraft systems, the alternative drive will become lighter and also less expensive.

The failure probability of the alternative drive is furthermore improved with respect to the previous failure probability on a use of the conventional system according to the prior art.

Further preferred aspects of the invention result from the description herein.

Accordingly, the main drive continues to be fed from a power supply system of the aircraft.

In accordance with a preferred embodiment of the invention, the decentralized energy sources are provided for driving the alternative drive via batteries or ultracaps. A plurality of batteries are collected together in the battery pack, with the batteries collected together there advantageously comprising different principles of action, i.e. being based on different technologies. This results in a dissimilar drive architecture with respect to the alternative drives, whereby the failure probability of the total system is improved even further.

In accordance with an advantageous embodiment of the invention, the main drive and the alternative drive are connected to the high lift system via a simple summing transmission. The summing transmission can advantageously be a spur gear transmission or a bevel gear transmission. The main drive can furthermore be separable from the summing transmission via a coupling.

The decentralized energy source can be rechargeable periodically via the main drive or an AC current source.

The decentralized energy source can furthermore still supply further functional groups of the high lift system with energy on a failure of the main drive beside the energy supply of the alternative drive. With a corresponding transmission design, the so-called power-off brake of the main drive thus may have to be opened to allow an alternative operation by the alternative drive. The opening of this power-off brake can take place, for example, by the decentralized energy source when the central energy supply is disturbed by the power supply system of the aircraft.

A flap of the high lift system is particularly advantageously connected to a plurality of separate drives.

BRIEF DESCRIPTION OF THE DRAWINGS

Further features, details and advantages of the invention will be explained in more detail with reference to an embodiment shown in the drawing. There are shown.

DESCRIPTION OF THE PREFERRED EMBODIMENTS

Figure 1:
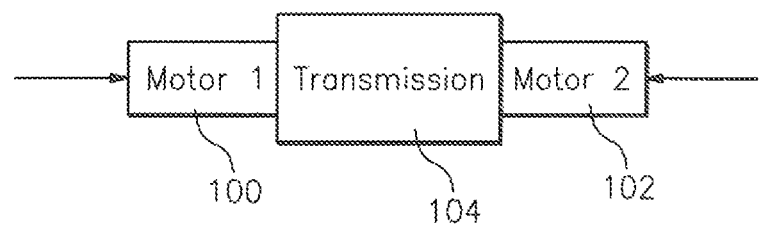
FIG. 1: the schematic design of a part of the high lift system in accordance with the prior art.

FIG. 1 schematically shows the design of a drive of a high lift system, not shown in any more detail here, of an aircraft for converting electrical or hydraulic energy into a speed-controlled rotational movement. A first motor 100 is here coupled to a second motor 102 via a transmission 104. The first motor 100 and the second motor 102 are electrically or hydraulically connected to the power supply of the aircraft. In the active/active variant, both motors 100 and 102 are connected to one another via a differential (speed summing) transmission or via a simpler (torque summing) transmission.

In an active/passive variant, the motors 100 and 102 are in turn both connected to the power supply of the aircraft, with them here likewise being able to be electrically or hydraulically connected. The motors are now connected to one another via a simple transmission (torque summing transmission). The second motor is only used when the first motor fails.

Figure 2:
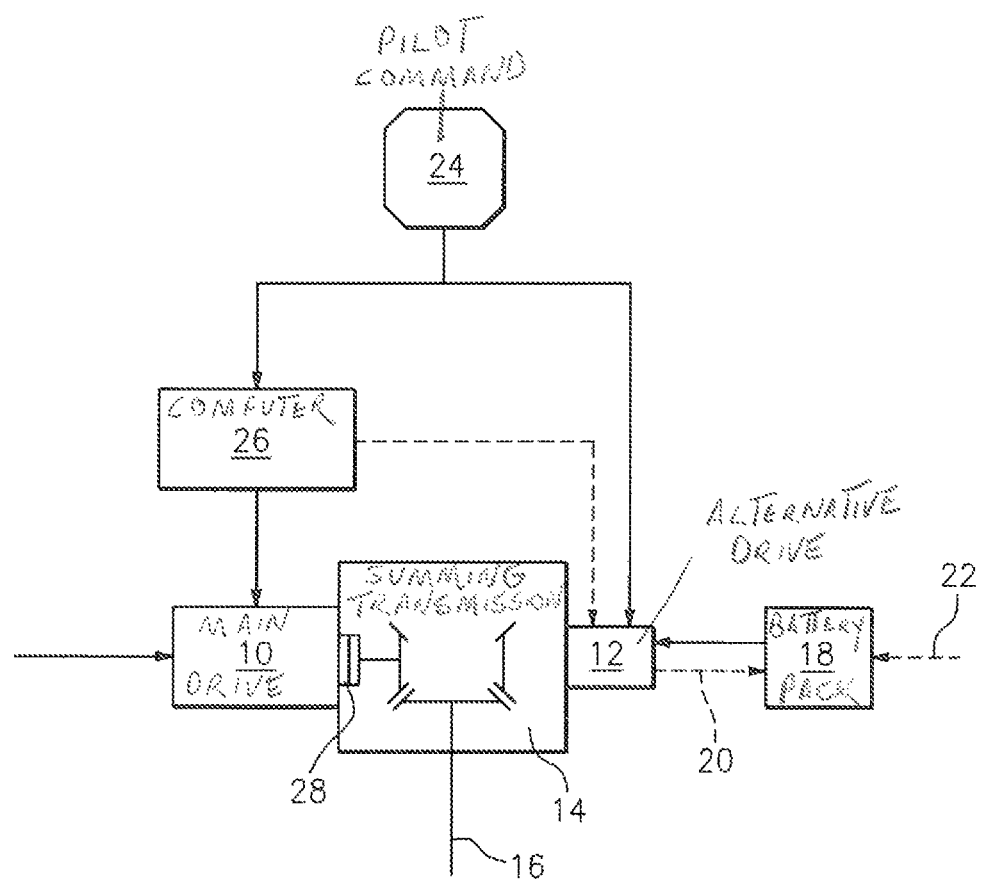
FIG. 2: the drive of a high lift system in accordance with an embodiment of the present invention.

In FIG. 2, the drive architecture of the new high lift system in accordance with the present invention is shown in an example. A main drive 10 and an alternative drive 12 are provided here which are connected via a simple summing transmission 14 in the form of a spur gear transmission or bevel gear transmission to an output shaft 16 which are connected to the high lift system (not shown here). Whereas the main drive 10 is electrically or hydraulically connected to a power supply of the aircraft in a manner known per se, the alternative drive 12 is supplied with power from a battery pack 18. The battery pack 18 in the embodiment here comprises lithium ion batteries. The battery pack can optionally be recharged via the main drive, which is indicated by the chain-dotted arrow illustration 20. In accordance with a further option, the batter pack 18 can, however, also be recharged via an AC current supply of the aircraft, which is shown by the chain-dotted arrow 22.

The command structure for the corresponding control commands is furthermore shown in FIG. 2. The alternative drive can be controlled by the pilot command marked by 24 either via a computer 26 or directly by the pilot command.

As can likewise be seen from FIG. 2, the main drive 10 can be separated from the transmission 14 via a coupling 28.

The invention claimed is:

1. An aircraft having at least one high lift system which is arranged at a wing of the aircraft and which comprises a drive for converting electrical or hydraulic energy into a speed-controlled rotational movement, wherein
   the aircraft furthermore has at least one control unit which controls the high lift system,
   the drive comprises a main drive and an alternative drive,
   with the main drive being fed by a power supply system of the aircraft and the alternative drive being fed from a decentralized energy source unconnected to the power supply of the aircraft, and
   the main drive and the alternative drive are connected the high lift system via a summing transmission.

2. An aircraft in accordance with claim 1, wherein the decentralized energy sources are batteries or ultracapacitors.

3. An aircraft accordance with claim 2, wherein a plurality of batteries are combined to form a battery pack, with the battery pack advantageously comprising batteries having different principles of action.

4. An aircraft in accordance with claim 1, wherein the summing transmission is a spur gear transmission or a bevel gear transmission.

5. An aircraft in accordance with claim 4, additionally comprising an output shaft connecting the spur gear transmission or bevel gear transmission to the high lift system.

6. An aircraft in accordance with claim 1, wherein the main drive is separable from the summing transmission via a coupling, with the coupling being fed from the decentralized energy source.

7. An aircraft in accordance with claim 1, wherein the decentralized energy source can be recharged periodically via the main drive or via a DC or an AC power source.

8. An aircraft in accordance with claim 1, wherein the decentralized energy source is configured to supply separate functional groups of the high lift system with energy beside the energy supply of the alternative drive on a failure of the main drive.

9. An aircraft in accordance with claim 1, wherein a flip of the high lift system has a plurality of separate alternative drives.

10. An aircraft in accordance with claim 1, additionally comprising a pilot command and a computer,
   with the alternative drive configured to be controlled by the pilot command, either directly or through the computer.

* * * * *